Dec. 9, 1947.                    P. A. LANG                    2,432,428
                         SELF-FEEDING SOLDERING TOOL
                            Filed Feb. 14, 1946
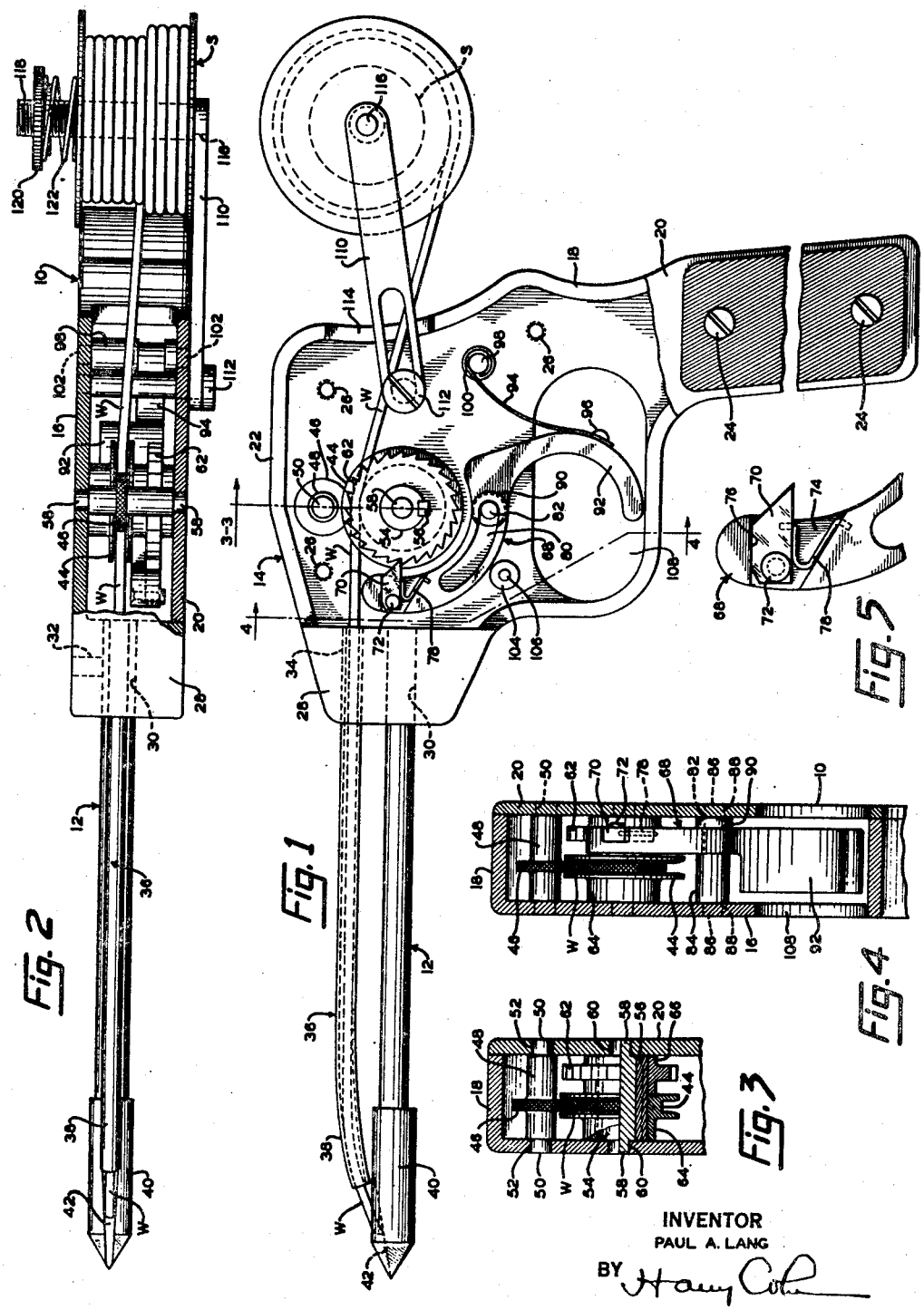
INVENTOR
PAUL A. LANG
BY *Harry Cohen*
ATTORNEY Patented Dec. 9, 1947

2,432,428

UNITED STATES PATENT OFFICE 2,432,428

SELF-FEEDING SOLDERING TOOL

Paul A. Lang, Elizabeth, N. J.

Application February 14, 1946, Serial No. 647,558

5 Claims. (Cl. 113—109)

The present invention relates to self-feeding soldering tools.

One object of the present invention is to provide a self-feeding soldering tool which is of simple and inexpensive construction, which is easy to operate, and which is reliable in operation. More specifically, it is an object of the present invention to provide a self-feeding soldering tool which can be readily assembled from parts of simple construction. Further it is an object of this invention to provide a hollow, pistol-shaped or gun-shaped handle-housing in which the solder-feeding mechanism is mounted and which provides a well balanced handle for the soldering iron, and to construct the handle-housing and the mechanism which is disposed therein in such manner as to facilitate the operations of assembling said parts in operative relation within the handle-housing.

Another object of this invention is the provision of a soldering tool having a solder-feeding mechanism of improved construction and operation, particularly in respect to the simplicity of the mechanism and its readily controlled operation for facilitating the feed of the solder to the tip of the soldering iron.

A further object of the invention is to provide a soldering iron which is so constructed as to conserve the solder supplied thereto by the feeding mechanism and for this purpose to provide the tip of the soldering iron to which the solder is supplied with means for guiding the molten solder to the point of application thereof on the work and to prevent the molten solder from splashing or running off the side of the soldering iron.

The above and other objects, features and advantages of the present invention will be fully understood from the following description considered in connection with the accompanying illustrative drawings.

In the drawings:

Fig. 1 is a side view of a self-feeding soldering tool embodying the present invention, a part of the handle-housing being broken away for the purpose of illustration;

Fig. 2 is a top plan view thereof, a part of the housing being broken away for the purpose of illustration;

Fig. 3 is a sectional view on the line 3—3 of Fig. 1;

Fig. 4 is a sectional view on the line 4—4 of Fig. 1;

Fig. 5 is a fragmentary side view, on a larger scale, of a part of the solder-feeding mechanism.

Referring now to the drawings in detail, the self-feeding soldering tool of the present invention comprises a handle-housing 10 in which the soldering iron 12 is secured and in which the solder-feeding mechanism hereinafter described is disposed. The handle-housing 10 may be formed of metal, preferably aluminum, or of Bakelite, or of any other suitable plastic, or of any other suitable material. It comprises a chambered body 14, having a flat side wall 16 and a peripheral wall 18. A cover 20, which is preferably in the form of a flat plate, is disposed in abutting relation to the edge 22 of the peripheral wall 18 of the handle body 14, said cover plate 20 being removably secured to said body in any suitable way as by a plurality of screws 24, two of which are indicated in Fig. 1, additional screws (not shown) being preferably provided as indicated by the provision of the holes 26 in the side wall 16. Self-tapping screws may be used or the holes for the screws may be threaded or nuts may be provided for the threaded ends of the screws. Thus, the handle-housing comprises, as here shown, two parts which define a housing or chamber for the solder-feeding mechanism, and it will be understood that said parts may be secured together by any suitable means.

The front end portion 28 of the body 14 extends from the side wall 16 of said body to the opposite side thereof laterally beyond the peripheral edge 22. Said end portion 28 is provided with an opening 30 in which the rear end of the soldering iron 12 is secured, and said end portion is also provided with a transverse opening 32 (Fig. 2) for the terminal ends of an electric cord for supplying heating current to the soldering iron 12 when the latter is an electrically heated iron, such iron being preferred. End portion 28 is also provided with an opening 34, in which the rear end of the guide tube 36 for the solder is secured. The inner end of said tube is in communication with the interior of the handle-housing and the outer end 38 of said tube is disposed adjacent to but spaced from the tip 40 of the soldering iron. It will be understood that the solder wire indicated at W is supplied by the solder-feeding mechanism through tube 36 to the tip 40 of the soldering iron. Preferably, as here shown, the tip 40 of the soldering iron is provided with a groove 42 which extends longitudinally of the tip toward the point thereof for guiding the molten solder to the point of application to the work and to prevent the solder from splashing off the iron, thus conserving solder and facilitating its application to the work at hand.

The solder-feeding mechanism comprises a grooved roller 44 and a companion roller 46, the peripheral surfaces of said rollers being preferably knurled for frictional feeding-engagement with the solder wire W, which passes between said knurled surfaces from the supply spool S, or from any other suitable supply, when the rollers 44 and 46 are operated for feeding the solder wire. Roller 46 is preferably formed integrally with a pin 48 which has reduced end portions 50 which are journalled for rotation in the companion openings 52 in the opposite side walls 16 and 20 of the handle-housing. Roller 44 is fixed to a pin 54, in any suitable way, as by means of a spline or key 56, the opposite ends 58 of pin 54 being of reduced diameter and being journalled for rotation in openings 60 in the opposite side walls of the handle-housing. A ratchet wheel 62 is also mounted on pin 54 and is secured thereto by the spline or key 56 whereby said ratchet wheel is operatively connected to roller 44 for turning the latter. It will be noted that roller 44 is provided with an integral boss 64 and that the ratchet wheel 62 is provided with integral bosses 66 at the opposite sides thereof, so that when the ratchet-roller unit and the roller 46 are positioned in the housing, movement thereof laterally between side walls 16 and 20 is prevented and so that said roller 46 registers with and projects into the groove of the companion solder-feeding roller 44. Further, in this connection it will be noted that the reduced end portions 50 of pin 48 which carries the roller 46 provides shoulders which engage the adjacent surfaces, respectively, of the opposite side walls of the handle-housing to hold said roller in proper position in relation to the companion roller 44.

The means for actuating the ratchet wheel 62 for operating the solder-feed rollers 44 and 46 comprises a unitary member 68 which carries a pawl 70 pivotally mounted thereon by means of a pivot pin 72. Said pawl is positioned in a groove 74 in member 68, said groove being wider than said pawl to permit movement thereof in said groove. It will be noted that when member 68 is moved to the right, viewing Fig. 1, for operating the ratchet wheel to turn the solder-feeding roller 44 for feeding the solder to the soldering iron, pivotal movement of pawl 70 is prevented by the engagement of a side edge of said pawl with the adjacent side edge 76 of groove 74, and that on the other hand, when member 68 is moved to the left, pawl 70 can move pivotally in groove 74 over the teeth of the ratchet wheel 62 without turning said ratchet wheel. A light or weak spring 78 is secured at one end thereof to pawl 70 and at the opposite end thereof to member 68 for holding said pawl 70 releasably in its ratchet wheel operating position, said spring 78 being positioned in groove 74.

Member 68 is mounted for bodily movement in an arcuate path concentrically of the axis of rotation of pin 54 which axis is the axis of rotation of ratchet wheel 62. For this purpose member 68 is provided with an arcuate slot 80 in which a pin 82 is slidably engaged. Said pin has an enlarged portion 84 (Fig. 4) and the opposite ends 86 are of reduced diameter and fit within companion openings 88 in the opposite side walls of the handle-housing. Pawl-carrying member 68 has a lateral projection or boss 90 which spaces said member from the inner surface of the adjacent side wall or cover plate 20 of the handle-housing, while the enlarged portion 84 of pin 82 spaces said pawl-carrying member 68 from the opposite side wall 16 of the handle-housing. Boss 90 is open at one side thereof in registry with slot 80 to permit movement of member 68 transversely of pin 82.

The pawl-carrying member 68 is provided with an integral trigger-part or finger-engageable portion 92. Spring means, here shown as a flat spring 94, bears on and is secured to trigger part 92 for moving member 68 and the pawl carried thereby to its retracted position and for resiliently opposing the ratchet wheel actuating movement of member 68. One end of said spring is secured to trigger part 92 in any suitable way, as by a screw 96, and the opposite end of said spring engages a pin 98 in a peripheral recess 100 provided in said pin. As shown in Fig. 2, the opposite ends 102 of pin 98 are fitted in companion openings provided in the opposite side walls of the handle-housing. It will be noted that spring 94, which is preferably bowed, is effective to resiliently oppose movement of member 68 when the operator presses on the trigger part 92, and said spring operates to effect return movement of member 68 when the operator releases his finger from said trigger part 92.

The operating member 68 being mounted on the pin 82 which slidably engages said member in arcuate slot 80 also preferably has a limited pivotal movement about the axis of said pin, and it will be noted that spring 94 is effective to bias member 68 for said pivotal movement in a clockwise direction, viewing Fig. 1, whereby to hold pawl 70 carried by member 68 in resilient engagement with the ratchet wheel. It will be observed that when the operator presses on the trigger part 92 against the pressure of spring 94, member 68 and pawl 70 carried thereby move bodily in an arcuate path concentric with the axis of rotation of the ratchet wheel rather than pivotally on pin 82 so that the force exerted by the operator's finger on the trigger part acts substantially entirely as a ratchet-wheel turning force, thus substantially eliminating or reducing pressure on the ratchet wheel radially thereof to pin 54. A roller 104 is preferably positioned adjacent the edge of member 68 with slight clearance to prevent substantial pivotal movement of said member away from the ratchet wheel in the event that the operator of the soldering tool presses on said trigger part 92 improperly in moving said member for turning the ratchet wheel in solder-feeding direction. Said roller is preferably mounted on a pin 106 fitted in aligned openings in the opposite side walls of the handle-housing.

It will be noted that while the member 68 is mounted within the handle-housing the integral trigger part 92 of said member is accessible for operation externally of the housing, and that for this purpose the side wall 16 and the cover plate 20 which constitutes the opposite side wall of the housing are provided with openings 108 which are located adjacent a portion of the peripheral edge of the housing. The spool S which carries the solder wire W may be mounted on the handle-housing 10 as illustrated or in any other suitable way or said spool S may be mounted on a support which is independent and separated from said handle-housing. However, as here shown, the spool of solder wire is carried by an arm 110 which is releasably secured to the handle-housing by a shouldered screw 112. It will be noted that the back of the handle-housing is provided with an opening 114 for the passage of the solder wire from the spool S or from some other source of supply into the housing for feeding engagement by the rollers 44 and 46. The spool S is mounted on a pin 116 carried by arm 110, said pin having a threaded end portion 118 which is engaged by an adjustable nut 120. Said nut 120 bears on a spring 122 which engages the adjacent side of the spool S for applying a friction brake to the feed of solder from said spool by the solder-feeding mechanism.

From the above description it will be noted that the various parts of the solder-feeding mechanism are constructed and arranged in such relation to the handle-housing that said parts of the mechanism are properly positioned within the handle-housing and held in said position without the use of screws, rivets or other fastening devices, other than the screws or fastening devices which are utilized for securing the cover plate 20 to the chambered body 14 of the handle-housing 10. Further, it will be noted that all of the parts which are disposed within the handle-housing can be easily placed in position within the chambered part 14 of said housing, and that after the cover plate 20 is applied and secured, said parts are thereby automatically secured in the proper operative position within the handle-housing.

Thus it is seen that soldering tool described above is well adapted to accomplish the several objects of the present invention. It will be understood, however, that the invention may be embodied otherwise than as herein shown or described and that various changes in the details of construction and in the arrangement of parts of the illustrated embodiment may be made without departing from the underlying idea or principles of the invention within the scope of the appended claims.

Having thus described my invention, what I claim and desire to secure by Letters Patent is:

1. In a solder-feeding soldering tool comprising a handle carrying a soldering iron, means including a roller for feeding solder wire to said iron, and a ratchet wheel operatively connected to the roller for turning the same; means for turning said ratchet wheel comprising a pawl-carrying member positioned entirely beyond the periphery of said ratchet wheel outwardly of the latter and mounted for bodily movement while in said position in an arcuate path which is concentric with the periphery of said ratchet wheel and which confronts said periphery, a pawl carried solely by said member in movable relation thereto and engageable with said ratchet wheel for turning the latter when said member is moved in one direction in said arcuate path, spring means between said pawl and said pawl-carrying member for holding said pawl in operative engagement with said ratchet wheel for turning the latter when said member is moved in said one direction, said pawl being movable on said member in opposition to said spring so as to move in relation to said ratchet wheel circumferentially thereof when said member is moved bodily in the opposite direction in said arcuate path, and spring means operatively connected to said pawl-carrying member for resiliently opposing movement thereof in said one direction in said arcuate path and for moving said member in the opposite direction in said path.

2. In a solder-feeding soldering tool which comprises a soldering iron provided with a gun-shaped handle having a chamber therein, solder-feeding means in said chamber, and a rotary ratchet wheel in said chamber operatively connected to said solder-feeding means; a unitary member in said chamber positioned entirely beyond the periphery of said ratchet wheel outwardly of the latter and mounted for bodily movement while in said position in an arcuate path which is concentric with the periphery of said ratchet wheel and which confronts said periphery, said member being operatively connected to said ratchet wheel for turning the latter in one direction for operating said solder-feeding means to feed the solder to the soldering iron, said member having a part positioned adjacent said handle and accessible externally of said chamber for actuating said member to operate the ratchet wheel to feed the solder, and interengaging means on said handle and on said member for guiding the latter for movement in said arcuate path, said member having an arcuate slot and said handle having a pin projecting into said slot for guiding said member for its said bodily movement in said arcuate path.

3. In a soldering tool comprising a handle-housing having a soldering iron projecting therefrom, solder-feed rollers in said handle-housing, a guide extending from said handle-housing for guiding the solder from the handle-housing to the tip of said soldering iron, and a rotary ratchet wheel in said handle-housing operatively connected to one of said rollers for operating the rollers to feed the solder; means for actuating said ratchet wheel comprising a member in said handle-housing positioned entirely beyond the periphery of said ratchet wheel outwardly of the latter and mounted for bodily movement while in said position in an arcuate path which is concentric with the periphery of said ratchet wheel and which confronts said periphery, a pawl pivotally mounted on said member and engageable with said ratchet wheel for turning the latter in solder-feeding direction, said member having a part accessible externally of said handle-housing for operating said member to actuate said ratchet wheel through said pawl, and spring means operatively connected to said member for resiliently opposing its said actuating movement, said member being also mounted for limited pivotal movement to engage said pawl with said ratchet wheel and said pawl being biased toward said ratchet wheel by said spring means, operating on said pawl through said member.

4. In a soldering tool comprising a handle-housing having a soldering iron projecting therefrom, solder-feed rollers in said handle-housing, a guide extending from said handle-housing for guiding the solder from the handle-housing to the tip of said soldering iron, and a rotary ratchet wheel in said handle-housing operatively connected to one of said rollers for operating the rollers to feed the solder; means for actuating said ratchet wheel comprising a member in said handle-housing positioned entirely beyond the periphery of said ratchet wheel outwardly of the latter and mounted for bodily movement while in said position in an arcuate path which is concentric with the periphery of said ratchet wheel and which confronts said periphery, a pawl pivotally mounted on said member and engageable with said ratchet wheel for turning the latter in solder-feeding direction, said member having a part accessible externally of said handle-housing for operating said member to actuate said ratchet wheel through said pawl, and interengaging means on said handle and on said member for guiding the latter for movement in said arcuate path, and spring means operatively connected to said member for resiliently opposing its said actuating movement, said member being also mounted for limited pivotal movement to engage said pawl with said ratchet wheel and said pawl being biased toward said ratchet wheel by said spring means, operating on said pawl through said member.

5. In a soldering tool comprising a handle-housing having a soldering iron projecting therefrom, solder-feed rollers in said handle-housing, a guide extending from said handle-housing for guiding the solder from the handle-housing to the tip of said soldering iron, and a rotary ratchet wheel in said handle-housing operatively connected to one of said rollers for operating the rollers to feed the solder; means for actuating said ratchet wheel comprising a unitary member in said handle-housing positioned entirely beyond the periphery of said ratchet wheel outwardly of the latter and mounted for bodily movement while in said position in an arcuate path which is concentric with the periphery of said ratchet wheel and which confronts said periphery, a pawl pivotally mounted on said member and engageable with said ratchet wheel for turning the latter in solder-feeding direction, said member having an integral part accessible externally of said handle-housing for operating said member to actuate said ratchet wheel through said pawl, said member having an arcuate slot and said handle having a pin projecting into said slot for guiding said member for its said bodily movement in said arcuate path, and spring means operatively connected to said member for resiliently opposing its said actuating movement, said member being mounted for limited pivotal movement on said pin to engage said pawl with said ratchet wheel and said pawl being biased toward said ratchet wheel by said spring means, operating on said pawl through said member.

PAUL A. LANG.

REFERENCES CITED

The following references are of record in the file of this patent:

UNITED STATES PATENTS

| Number | Name | Date |
|---|---|---|
| 959,233 | Lanum | May 24, 1910 |
| 1,460,441 | Popper | July 3, 1923 |
| 2,125,781 | Harris | Aug. 2, 1938 |
| 2,175,100 | Albert | Oct. 3, 1939 |
| 2,195,944 | Stream | Apr. 2, 1940 |
| 2,251,557 | Weston | Aug. 5, 1941 |
| 2,254,521 | Gardner | Sept. 2, 1941 |
| 2,288,291 | Weston | Jan. 14, 1941 |

FOREIGN PATENTS

| Number | Country | Date |
|---|---|---|
| 481,669 | Great Britain | Mar. 15, 1938 |
| 496,395 | Great Britain | Nov. 30, 1938 |
| 19,507 | Great Britain | 1892 |